Feb. 5, 1952 W. P. DALRYMPLE 2,584,559
REEL
Filed July 22, 1948 3 Sheets-Sheet 1

INVENTOR.
WILLIAM P. DALRYMPLE
BY Wallace and Cannon
ATTORNEYS

Feb. 5, 1952 W. P. DALRYMPLE 2,584,559
REEL
Filed July 22, 1948 3 Sheets-Sheet 2

INVENTOR.
WILLIAM P. DALRYMPLE
BY Wallace and Cannon
ATTORNEYS

Feb. 5, 1952 W. P. DALRYMPLE 2,584,559
REEL
Filed July 22, 1948 3 Sheets-Sheet 3

INVENTOR.
WILLIAM P. DALRYMPLE
BY Wallace and Cannon
ATTORNEYS

Patented Feb. 5, 1952

2,584,559

UNITED STATES PATENT OFFICE 2,584,559

REEL

William P. Dalrymple, Rochester, N. Y., assignor to American Brake Shoe Company, New York, N. Y., a corporation of Delaware Application July 22, 1948, Serial No. 40,121

15 Claims. (Cl. 299—78)

This invention relates to reels for flexible members and more particularly to reels especially adapted for receiving and dispensing flexible members, such as, for example, air hoses, electric light cords, and the like.

In many instances, and especially around work shops, automobile service stations and similar places, it is highly desirable to store electric lights cords, air hoses and other like flexible members in such a manner that, when stored, they are out of the way and present a neat, pleasing appearance but are also readily accessible for use, and it is a primary object of my invention to enable this to be accomplished in a novel and expeditious manner.

A further object of my invention is to provide a novel reel from which the flexible members may be readily unwound and onto which they may be automatically rewound at the will of the operator, and which is compact in form and may be readily and economically manufactured.

Another object of my invention is to construct a reel for flexible members which embodies novel means for holding the reel against rewinding so that when the operator has withdrawn a selected length of the flexible member from the reel for use it will not be necessary for him to manually hold the flexible member from being rewound onto the reel.

An object ancillary to the foregoing is to construct a reel in such a manner that when it is desired to rewind the withdrawn portion of the flexible member this may be readily accomplished by further withdrawing the flexible member slightly from the reel and quickly releasing the same to thereby release the novel reel holding means and freeing the reel to automatically rewind the flexible member thereon.

A further object of my invention is to construct a reel wherein the holding means may be rendered effective to hold the reel against rewinding at any point in the 360° of rotation of the reel.

Another object of my invention is to construct a reel which will operate efficiently in the aforesaid manner with the axis of rotation of the reel disposed in any position.

A further object of my invention is to construct a reel for flexible members wherein the rewinding speed of the reel is controlled in a novel and expeditious manner, and an object ancillary to the foregoing is to provide a reel for flexible members wherein the winding and unwinding speed of the reel is controlled by friction members which are operated by the centrifugal force created by the rotation of certain control members, and wherein these same friction members may be utilized to releasably hold the reel in stationary position against rewinding when it is desired to use a portion of a flexible member withdrawn from the reel.

A further object of my invention is to enable a reel of the aforesaid type to be constructed in such a manner that the friction members which are utilized to control the winding and unwinding speed of the reel and to releasably hold the reel against rewinding, are effective so to do through their engagement with a common brake drum.

Another object of my invention is to construct a reel of the aforementioned type in such a manner that, when the friction members are utilized to hold the reel against re-winding, the forces induced upon the friction elements by their frictional engagement with the drum are effective to, in effect, self-energize the friction members to thereby increase the force of the frictional engagement of these friction members with the drum and thereby increase the force by which the reel is held against rewinding rotation.

Yet a further object of my invention is to prevent the reel from being secured in stationary position by the friction members when more than a predetermined amount of the flexible member has been withdrawn from the reel.

A further object of my invention is to so construct a reel of the above mentioned type that the speed control therefor may be adjusted.

Another object of my invention is to construct a reel which may be used with air hoses and the like and wherein the flow of working fluid to the hose may be automatically controlled in a novel and expeditious manner so that it is shut off therefrom when the hose is fully wound on the reel and will flow thereto only when the hose has been unwound from the reel a predetermined amount.

Other and further objects of the present invention will be apparent from the following description and claims and are illustrated in the accompanying drawings which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

Figure 1:
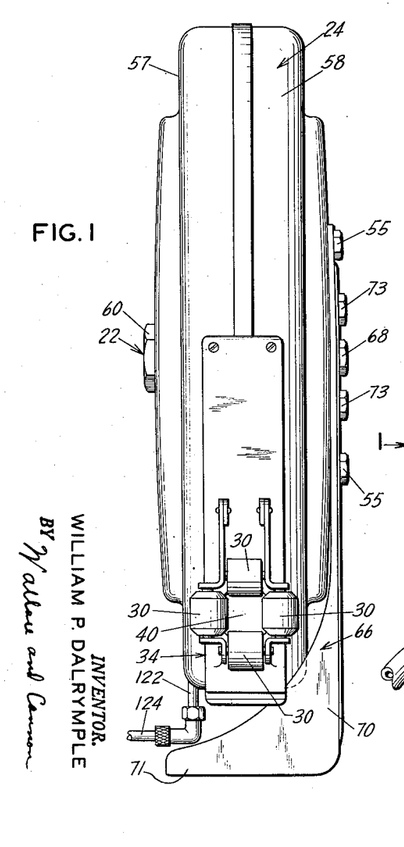
Fig. 1 is a front elevational view of an air hose reel embodying the principle of my invention.
Figure 2:
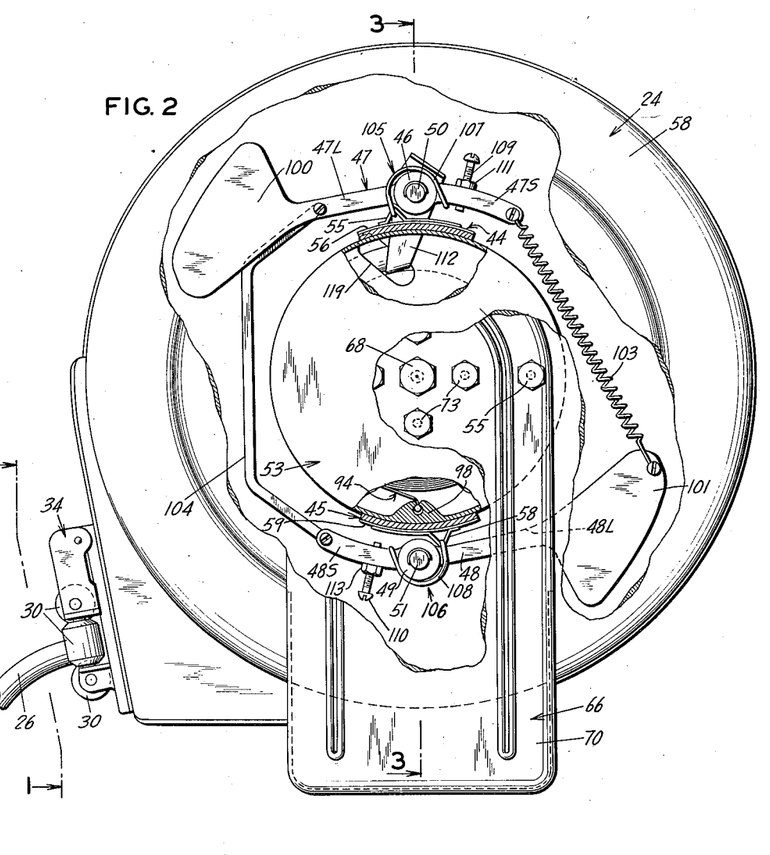
Fig. 2 is a side elevational view of the reel shown in Fig. 1, with portions broken away to show certain internal parts thereof.
Figures 3, 4, 6:
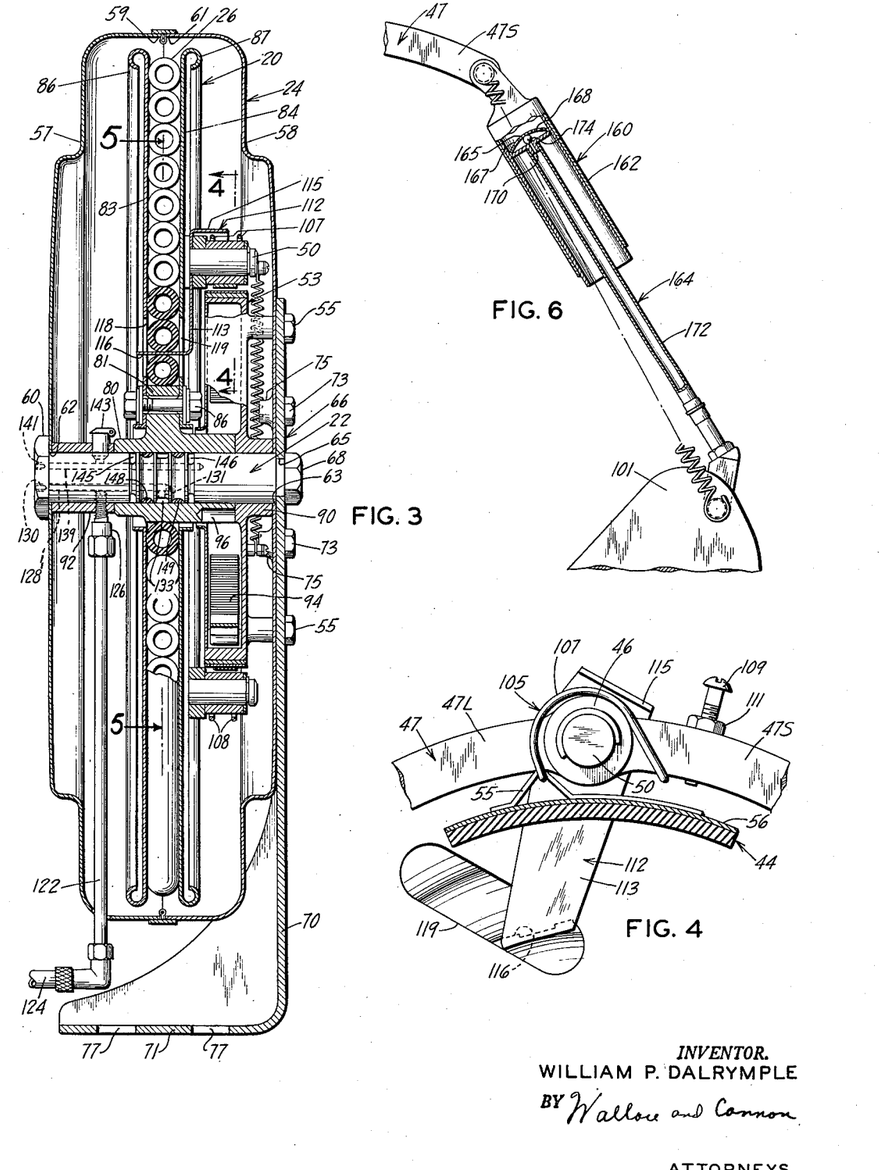
Fig. 3 is a sectional view taken substantially along the line 3—3 in Fig. 2.
Fig. 4 is a detail sectional view taken substantially along the line 4—4 in Fig. 3.
Fig. 6 is a detail view of a modified form of my invention.

The selected embodiment of my invention shown in the accompanying drawings comprises, in general, a spool 20, Fig. 3 rotatably mounted on a spindle 22 within a casing 24. A flexible member such as an air hose 26 may be wound on, or unwound from, the spool 20, the flexible member, during the winding or unwinding operations, passing through guide rollers 30 carried by a bracket 34 adjacent to an opening 40 formed in the casing 24. Two levers or arms 47 and 48, Fig. 2, are attached to the spool 20 by pins 50 and 51, respectively, for rotation therewith. Two friction elements or brake shoes 44 and 45 are carried by the respective levers 47 and 48 and are adapted to engage the peripheral edge portion of a drum or housing 53, non-rotatably secured to the casing 24 by bolts 55, to thereby control the winding and unwinding speed of the spool 20 and, when desired, to hold the spool in stationary position as will be presently described in greater detail.

The casing 24 comprises two substantially cup-shaped members 57 and 58 that abut each other at their peripheral edge portions 59 and 61, respectively. The shaft 22, having a head 60 on one end thereof, extends through openings 62 and 63 formed in the casing members 57 and 58, respectively, and through an opening 65 formed in a mounting bracket 66 for the casing 24, and has a nut 68 screwed onto the other end thereof for holding the two casing members 57 and 58 together.

The mounting bracket 66 is substantially L-shaped in character having two legs 70 and 71. The leg 70 is secured to the member 58 of the casing 24 by four bolts 73 screwed into bosses 75 projecting inwardly from the side wall of the casing member 58, and is further secured to the casing member 58 by the aforementioned bolts 55. The other leg 71 of the mounting bracket 66 has two openings 77 formed therein through which suitable fastening members, such as, for example, bolts, may be extended to secure my novel reel to any suitable supporting member such as, for example, a ceiling, wall, or floor, my novel reel being adapted to operate efficiently in any position as will be discussed in greater detail hereinafter.

The spool 20 comprises a hub 80, journaled on the shaft 22 and having a peripherally extending flange 81 to which two side plates 83 and 84 are connected by any suitable means such as bolts 86. The side plates 83 and 84 form the side walls of the spool 20 and the peripheral edge portions of these side plates are turned over to form flanges 86 and 87 to thereby present a rounded peripheral edge. The hub 80 of the reel 20 engages the hub portion 90 of the drum 53 on one side and is thereby spaced from the cup-shaped member 58 of the casing 24. On the other side the hub 80 is spaced from the cup-shaped member 57 of the casing 24 by a sleeve 92 mounted on the spindle 22.

A spiral spring 94, Figs. 2 and 3, is mounted within the drum 53 around the shaft 22 and has its inner end portion anchored in a notch 96 formed in the hub 80 of the spool 20, and the outer end portion thereof is anchored in a boss 98 in the non-rotatably mounted drum 53. The clock spring 94 is disposed in the drum 53 in such a manner that upon clockwise rotation of the spool 20, as viewed in Fig. 2, the spring tends to tighten or wind up so that when the spool 20 has been rotated in a clockwise direction to withdraw a portion of a flexible member such as the air hose 26 therefrom, the spring 94 is effective to urge the spool 20 in a counterclockwise direction to thereby again wind the withdrawn portion of the flexible member onto the spool 20 as will be discussed in greater detail presently.

As is best seen in Fig. 2, the levers 47 and 48 have short end portions 47S and 48S, respectively, and long end portions 47L and 48L, respectively, the latter end portion having counterweights 100 and 101 formed thereon for a purpose which will be presently discussed. The short end portion 47S of the lever 47 and the long end portion 48L of the lever 48 are connected together by a suitable tension spring 103, and the long end portion 47L and the short end portion 48S of the respective levers are connected together by a link 104.

The friction elements or brake shoes 44 and 45 are connected to the levers 47 and 48 by hangers 105 and 106, each of which is formed of suitable material such as, for example, a continuous strip of spring steel forming respective pairs of side arms 107 and 108 the ends of which are connected together by suitable transverse members. The side arms 107 and 108 of the hangers 105 and 106, respectively, rest on the hubs 46 and 49 of the levers 47 and 48. One transverse member of the hanger 105 extends across beneath the short end portion 47S of the lever 47, and the other transverse member thereof extends through a loop 55 formed on the backing member 56 of the brake shoe 44 and positioned below the long end portion 47L of the lever 47. Similarly, one transverse member of the hanger 106 extends across beneath the short end portion 48S of the lever 48, and the other transverse member thereof extends through a loop 58 formed on the backing member 59 of the brake shoe 44 and positioned below the long end portion 48L of the lever 48. Thus, it will be seen that the brake shoes 44 and 45 are supported from the levers 47 and 48, respectively, by a resilient rocking connection which affords a freedom of movement whereby the brake shoes may adapt themselves for different conditions of operation. Also it will be noted that the connection between the hangers 105 and 106 and the brake shoes 44 and 45 is made on the side of the pins 50 and 51 closest to the respective counterweights 100 and 101 and that, therefore, the action of the spring 103 is effective to urge the brake shoe 45 toward engagement with the drum 53.

When a flexible member is in fully wound position on my reel a short end portion is left extending therefrom. This may be assured by fastening a stopping member, not shown, to the free end portion of the flexible member 26, this stopping member being of sufficient size so that it will not pass between the rollers 30 and being any one of several types which are well known to the art such as, for example, a rubber ball such as that commonly used on air hoses and the like.

Thus, with a portion of the flexible member 26 always extending from the casing 24, when it is desired to withdraw a portion of the flexible member from the spool 20 for use, the operator may grasp the extending portion and pull thereon. This pulling of the flexible member 26 causes the spool 20 to rotate in a clockwise direction as viewed in Fig. 2 and thereby causes the friction elements 44 and 45 to rotate in a clockwise direction with respect to the drum 53. The centrifugal force set up by the rotation of the counterweights 100 and 101 with the spool 20 causes the levers 47 and 48, respectively, to tend to pivot in a clockwise direction as viewed in Fig. 2 on their fulcrum points 50 and 51 and thereby tends to raise the friction elements 44 and 45 out of contact with the drum 53. Two adjustable stop members such as, for example, screws 109 and 110 are mounted in the short end portions 47S and 48S of the levers 47 and 48, respectively, in alignment with the brake shoes 44 and 45 and may be adjusted toward and away from the brake shoes 44 and 45 by screwing them into and out of the levers 47 and 48 for a purpose which will be discussed presently. Suitable lock nuts 111 and 113 are mounted on the screws 109 and 110 to hold them in adjusted position on the levers 47 and 48.

As hereinbefore mentioned, when the operator pulls on the protruding end portion of the flexible member 26 and starts the spool 20 rotating in a clockwise direction, as viewed in Fig. 2, the centrifugal force set up by the rotation of the counterweights 100 and 101 first tends to lift the brake shoes 44 and 45 out of engagement with the drums 53, and thereby permits relatively free rotation of the spool 20. As long as the rotation of the spool 20 does not exceed a predetermined speed this free rotation is continued. However if the rotation of the spool 20 does exceed a predetermined speed, as determined by the adjustment of the stops 109 and 110, the additional centrifugal force created by this excessive rotation of the counterweights 100 and 101 causes the levers 47 and 48 to rotate upon their pivot pins 50 and 51, respectively, sufficiently to cause the stop members 109 and 110 to engage the backing members 56 and 59 of the brake shoes 44 and 45 and thereby press the brake shoes 44 and 45 inwardly against the drum 53 to retard the rotation of the spool 20. Thus it will be seen that when the spool 20 is in stationary position the spring 103 tends to hold the friction elements 44 and 45 in engagement with the drum 53 and thereby hold the spool 20 in stationary position. This holding force of the brake shoes 44 and 45 is overcome by centrifugal force set up by normal rotation of the counterweights 100 and 101, but the brake shoes 44 and 45 are again effective to engage the drum 53 to retard the rotation of the spool 20 if this rotation exceeds a predetermined speed.

When a portion of the flexible member 26 has been withdrawn for use from the reel in the manner hereinbefore discussed, it is desirable that the spool 20 be held against rewinding rotation while the flexible member is in use so that the operator will be relieved of the strain and inconvenience of manually holding the flexible member against rewinding. In my novel reel this holding of the spool 20 in stationary position is expeditiously performed by the brake shoes 44 and 45. Thus it will be seen that when the proper amount of the flexible member 26 has been withdrawn from the spool and the spool 20 is stopped, the spring 103 causes the levers 47 and 48 to rotate on their fulcrums 50 and 51, respectively, and thereby urges the brake shoes 44 and 45 into frictional engagement with the drum 53. Although the spring 94 tends to cause the spool 20 to rotate in a counterclockwise direction, as viewed in Fig. 2, to thereby rewind the flexible member 26 upon the spool 20, the frictional engagement of the brake shoes 44 and 45 is sufficient to hold the spool 20 in stationary position against the urging of this spring. In this connection it will be noted that because of the manner in which the brake shoes 44 and 45 are pivotally mounted upon the levers 47 and 48, the urging in a counterclockwise direction of the spool 20 by the spring 94 tends to drag the brake shoes 44 and 45 into tighter engagement with the drum 53, to thereby, in effect, self-energize the brake shoes 44 and 45 and assist the spring 103 in urging them into tight frictional engagement with the drum 53 to hold the spool 20 from rotating in a winding direction.

When it is desired to again rewind the withdrawn portion of the flexible member 26 upon the reel 20 this may be readily accomplished by pulling sharply on the protruding portion of the flexible member 26 and then quickly releasing it.

The sharp pull on the flexible member 26 causes the spool 20 to rotate in an unwinding direction at a relatively high speed and thereby causes the counterweights 100 and 101 to be thrown outwardly to unseat the brake shoes 44 and 45 from the peripheral edge portion of the drum 53. When this short rotation is abruptly stopped, as by the operator quickly releasing the flexible member 26, the inertia of the counterweights 100 and 101 tends to hold the counterweights 100 and 101 in their outward position and thereby delays seating of the brake shoes 44 and 45 against the drum 53. Before the spring 103 is effective to pull the counterweights 100 and 101 in toward the drum 53 the spring 94 is effective to start counterclockwise or winding rotation of the spool 20 to thereby exert centrifugal force on the counterweights 100 and 101 and maintain these counterweights in an outward position and thereby hold the brake shoes 44 and 45 away from the drum 53. As was previously discussed with respect to the unwinding rotation of the spool 20, as long as the winding speed of the spool 20 remains below a predetermined limit the winding of the spool 20 is relatively free. However, if this predetermined speed is exceeded the counterweights 100 and 101 are thrown outwardly by centrifugal force to such a position that the adjustable stops 109 and 110 engage the backing members 56 and 59 of the brake shoes 44 and 45 and thereby urge the brake shoes 44 and 45 into engagement with the drum 53 to thereby control the speed of the spool 20. Thus it will be seen that by proper adjustment of the stops 109 and 110 the winding and unwinding speed of the spool 20 may be regulated so as to remain within the predetermined limits.

It will be noted that when a portion of the flexible member 26 has been extended and it is desired to rewind this portion upon the spool 20, it is essential, in order to accomplish this properly, that a sufficient amount of the flexible member 26 still remain on the spool 20 so that the spool 20 may be caused to rotate in an unwinding direction by pulling on the extended portion of the flexible member. To assure this, I have provided a release lever 112.

The release lever 112, Figs. 3 and 4, has a central body portion 113 and two oppositely disposed legs 115 and 116 projecting transversely therefrom. The body portion 113 of the release lever 112 is pivotally mounted on the pin 50 carried by the spool 20, and the leg 116 extends through slots 118 and 119 formed in the side plates 83 and 84 of the spool 20, and is positioned between the first and second of the innermost convolutions of the flexible member 26. The outer leg 115 of the release lever extends over the short end portion 47S of the lever 47.

Figures 5, 7, 8, 9:
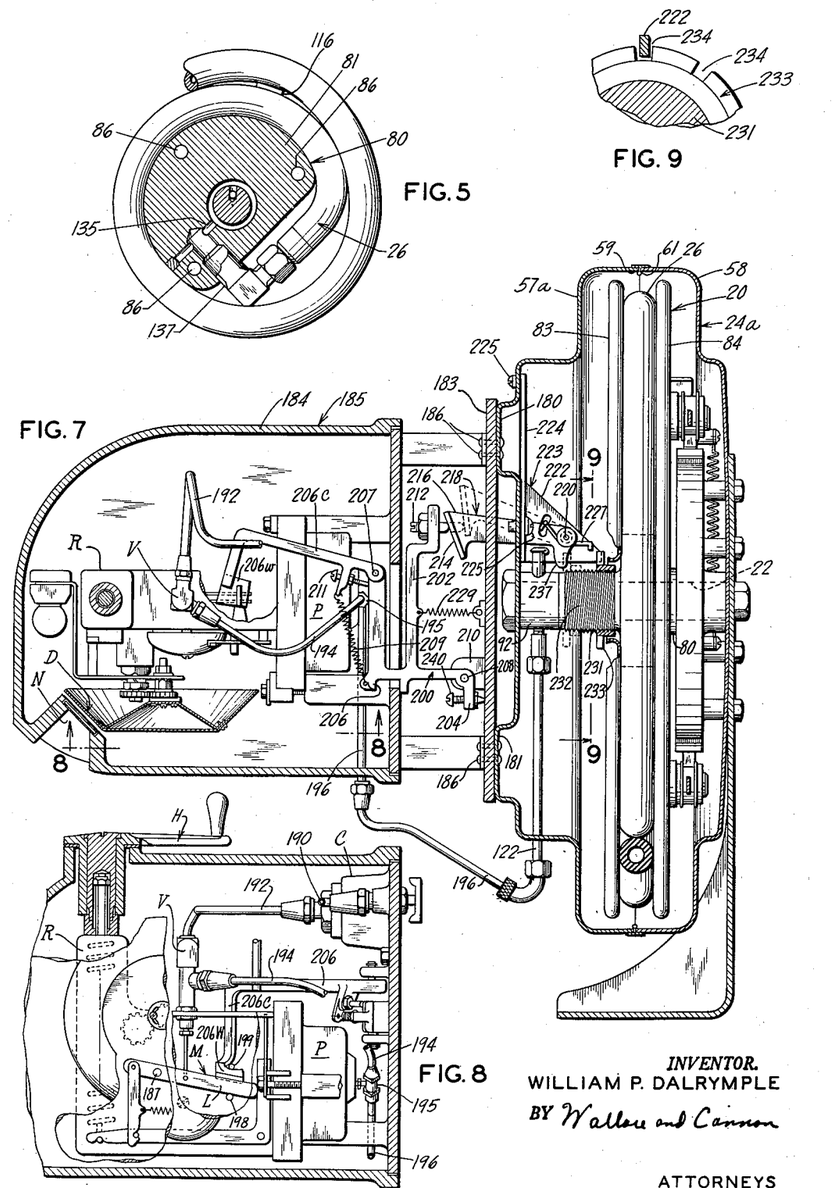
Fig. 5 is a detail sectional view taken substantially along the line 5—5 in Fig. 3.
Fig. 7 is a sectional view similar to Fig. 3 but showing another modified form of my invention.
Fig. 8 is a detail sectional view taken substantially along the line 8—8 in Fig. 7.
Figure 9 is a detail view of the nut rotation restraining mechanism.

Thus, as is best seen in Figs. 2, 3 and 5, it will be noted that when all but one of the convolutions of the flexible member 26 have been unwound from the spool 20 further unwinding of the flexible member 26 therefrom will cause the flexible member to pull outwardly on the leg 116 of the release lever 112 and thereby cause the release lever 112 to rotate in a clockwise direction as viewed in Fig. 2. This rotation of the release lever in a clockwise direction will cause the leg 115 to engage the short end portion 47S of the lever 47 and thereby pivot the lever 47 in a clockwise direction on its pivot pin 51 to thereby the brake shoe 44 out of engagement with the drum 53. Likewise this clockwise rotation of the lever 47, because of its connection through the link 104 with the short end portion 48S of the lever 48 will cause the lever 48 to be rotated in a clockwise diretion on its pivot pin 51 to thereby raise the brake shoe 45 out of engagement with the drum 53. Thus it will be seen that with my novel device when the amount of the flexible member 26 remaining on the spool 20 is not sufficient to readily release the friction elements 44 and 45 from holding engagement with the drum 53 by pulling on the flexible member and then quickly releasing it, the brake shoes 44 and 45 are maintained out of such holding relation with the drum 53 by the release lever 112. The release lever 112 is, therefore, effective to insure that when the brake shoes 44 and 45 are in holding engagement with the drum 53, during normal operation of my novel reel, a sufficient amount of the flexible member 26 remains on the spool 20 to effect release of the brake shoes 44 and 45 in the normal manner.

Although it will be understood that my novel reel may be used with flexible members other than air hoses, the embodiment of my invention shown in the accompanying drawings comprises a reel which is especially adapted for use with air hoses, such as for example, the type commonly used in automobile service stations for inflating tires. Thus as best seen in Fig. 3, I provide an air inlet pipe 122, one end of which may be connected by a supply line 124 to a suitable source of compressed air, and the other end of which is connected to a nipple 126 extending through the sleeve 92 and screwed into the spindle 22 into communication with a passage 128 extending longitudinally through the spindle. One end of the passage 128 is sealed by a suitable plug 130 screwed thereinto and the other end portion of the passage 128 is in communication with a transversely extending passage 131 by which it is connected to a groove 133 formed in the peripheral edge portion of the spindle 22. A passage 135, Fig. 5, is formed transversely in the hub 80 of the spool 20 and is in communication with the groove 133 formed in the spindle 22. A suitable connecting nipple 137 on the inner end portion of the air hose 26 is screwed into the flange 81 of the hub 80 into communication with the passage 135 so that air may be fed from the source of supply through the pipe 22, the nipple 126, the passage 128, the passage 131, the groove 133, the passage 135 and the nipple 137 to the air hose 26.

A second longitudinally extending passage 139 is provided in the spindle 22 and one end thereof is sealed by a suitable plug 141. An oiler 143 extends through the sleeve 92 and transversely into the spindle 22 where it is in communication with the longitudinally extending passage 139. The inner end portion of the passage 139 is in communication with two grooves 145 and 146 formed in the peripheral edge portion of the spindle 22 on opposite sides of the groove 133 so that oil or other suitable lubricant may be supplied from the oiler 143, through the passage 139 and the grooves 145 and 146, into the space between the spindle 22 and the hub 80 to lubricate the connection therebetween. Two packing rings 148 and 149 are suitably mounted in grooves formed in the spindle 22 on opposite sides of the groove 133 to prevent oil or grease from passing from the grooves 145 and 146 into the air passage or groove 133.

In Fig. 6 is shown a modified form of my invention wherein a dash pot 160 is utilized to assist in maintaining the brake shoes 44 and 45 out of engagement with the drum 53 during the release of the spool 20 from stationary position for the purpose of rewinding a withdrawn portion of the flexible member 26. Thus, it will be noted that I have shown a dash pot 160 comprising a cylinder 162 attached to the short end portion 47S of the lever 47, and a piston 164 attached to the counterweight 101. The piston 164 is reciprocally mounted in the cylinder 162 and has a head 165 thereon having openings 167 and 168 in the inner wall thereof and an opening 170 in the outer wall thereof. The opening 170 is in communication with the hollow stem 172 of the piston 164 which stem is in communication with the atmosphere, and a suitable check valve such as for example a ball 174 is mounted in the hollow head 165 of the piston 164 in such a manner as to permit substantially unrestricted passage of air from the stem 172 of the piston through the openings 170, 165 and 168 into the cylinder 160 but to restrict the reverse flow therethrough. Thus it will be seen that when, as previously discussed, it is desired to release the spool 20 for automatic rewinding of the flexible member 26 by the spring 94 and the protruding portion of the flexible member 26 is, therefore, pulled sharply, the dash pot 160 creates little resistance to the outward movement of the counterweights 100 and 101, but when the flexible member 26 is then quickly released to permit rewinding of the spool 20 the dash pot 160 is effective to restrain the counterweights 100 and 101 from swinging inward and thereby assists in restraining the engagement of the brake shoes 44 and 45 with the drum 53 while the spool 20 is gaining sufficient speed that the counterweights 100 and 101 will be held in outward position by centrifugal force.

In Figs. 7, 8 and 9 is shown another modification of the novel hose reel shown in Figs. 1–5 whereby regulation of the supply of air to the flexible member or air hose 26 may be automatically effected in such a manner that the hose will not be under pressure when it is fully rewound upon the spool 20 but will be under pressure only when the hose 26 is extended from the spool 20 into position of use.

The portions of the reel shown in Fig. 7 which are the same as the portions of the reel shown in Figs. 1–5 inclusive are indicated by the same reference numerals and those portions which are similar to portions shown in Figs. 1–5, but which have been modified are indicated by the same reference numerals with the suffix, "a," added thereto.

It will be noted that in Fig. 7 the spool 20 is journaled on a spindle 22 within a casing 24a which casing comprises two substantially cup-shaped members 57a and 58. The cup-shaped member 57a has been modified to provide attaching flanges 180 and 181 to which a base plate 183 of a housing 184 for a metering valve 185 may be attached by suitable means such as rivets 186, the metering valve 185 affording means for controlling the 'feeding of' air from a supply line 190, Fig. 7, to the air hose 26, as will be discussed in greater detail presently.

The air metering valve 185 comprises an air service device of the same general type disclosed in United States Letters Patent No. 1,918,612 granted to Albert Penn on July 18, 1933, and which is operable to feed air to a receptacle in a series of relatively short successive charges until the pressure in the receptacle has been raised to a predetermined amount, at which time the air metering valve is automatically closed and thereby rendered inoperative to feed more air to the receptacle being inflated. I make no claim to the metering valves, per se, as embodying the present invention except insofar as it forms a part of my novel combination.

In general, the air metering valve 185 comprises a crank or handle H by which an operator may manually adjust or set a regulating mechanism R, an indicator dial D, visible through an opening N in the housing 184, affording visible indicia for determining the setting to which the regulating mechanism has been adjusted. The regulating mechanism R is operatively connected to a lever L which forms a part of an actuating mechanism M which is operable to open and close a valve V connected between the supply line 190 and the air hose 26 as will be presently described. The lever L is pivotally mounted on a pin 187 and is operable upon rotation in a counter-clockwise direction, as viewed in Fig. 8, to open the valve V, and upon rotation in a clockwise direction to effect closing of the valve V.

A pressure sensitive mechanism P is operably connected to the lever L of the actuating mechanism M, in opposition to the regulating mechanism R, and is effective, as will be presently discussed in greater detail, when the pressure in the service hose 26 and the receptacle being inflated reaches a predetermined pressure, as determined by the setting of the regulating mechanism R, to effect valve closing operation of the actuating mechanism M and thereby cause the valve V to be closed.

The air inlet line 190 is connected through a condensing chamber C and a coupling member 192 to the inlet side of the valve V. The outlet side of the valve V is connected by a coupling member 194, a T-fitting 195, and a coupling member 196 to the air inlet pipe 122, the inlet pipe 122 being connected to the air hose 26 in the same manner as previously discussed in reference to the hose reel shown in Figs. 1 to 5, inclusive. The other leg of the T-fitting 195 is connected to the pressure sensitive device P to thereby subject the pressure chamber of the pressure sensitive device to the pressure in the air hose 26 and the receptacle being inflated.

Two pins 198 and 199 form abutment members limiting the pivotal movement of the lever L, the lever L engaging the pin 198 when occupying valve-closing position and engaging the pin 199 when occupying valve-opening position.

During a receptacle-inflating operation the hose 26 is connected to the receptacle being inflated. When this occurs the air in the hose 26 flows into the receptacle causing the pressure in the pressure sensitive mechanism P to drop and thereby allow the regulating mechanism R to cause the lever L to move in a counter-clockwise direction, as viewed in Fig. 8, to thereby open the valve V. When the valve V opens, air flows therethrough from the line 190 into the hose 26 and thus into the receptacle being inflated. This causes the pressure in the hose 26 and, therefore, in the pressure sensitive device P, to be increased so that the pressure sensitive device P is actuated thereby and causes the lever L to move in a valve-closing direction to thereby close the valve V. When the valve V closes, the pressure in the hose 26 again drops as air flows therefrom into the receptacle being inflated and the valve V is again opened by the action of the regulating mechanism R on the lever L in the manner discussed above. These cycles of alternately opening and closing of the valve V are repeated in this manner until the pressure in the receptacle is increased to that pressure corresponding to the setting of the regulating mechanism R, at which time the pressure in the hose 26 and the T-fitting 195, and, therefore, in the pressure sensitive device P, remains at a sufficiently high amount to hold the lever L in valve-closing position and thereby prevent further feeding of air to the receptacle being inflated.

Means are embodied in the hose reel shown in Figs. 7 to 9, inclusive, which are operative to automatically render the metering valve effective and ineffective to feed air to the hose 26 in accordance with the position of the hose 26 on the spool 20. These means include an articulated bell crank lever 200 operable to be automatically moved by mechanism, which will be discussed in greater detail presently, into and out of latching engagement with the lever L in accordance with whether the reel 20 is disposed in wound or unwound position, respectively.

The bell crank lever 200 has three legs 202, 204 and 206, and is pivotally mounted by a pin 208 on a bracket 210 projecting inwardly from the base plate 183 of the housing 184. The leg 206 has an extension 206c pivotally connected thereto by a pin 207, a spring 209 and an adjusting screw 211 cooperating to hold the extension 206c in desired position relative to the main body portion of the leg 206.

The extension 206c of the bell crank lever 200 has a wedge-shaped ear 206w formed on one end thereof. The ear 206w is adapted to be swung into and out of engagement between the lever L and the pin 199 upon rotation of the lever 200 on the pin 208. When the ear 206w is positioned between the lever L and the pin 199, it is effective to positively hold the lever L in valve-closing position against the pin 198 and thereby render the metering valve 185 inoperative to feed air to the hose 26. However, when the ear 206w is disposed out of engagement between the lever L and the pin 199, the lever L is free to pivot in a normal operation of the metering valve 185. Thus it will be seen that the lever 200 affords effective means for controlling the operation of the metering valve 185.

A stop screw 212 is mounted in the free end portion of the leg 202 of the bell crank lever 200 and projects toward the free end 214 of one leg 216 of a second bell crank lever 218, the latter lever being pivotally mounted on a pin 220 projecting from one leg 222 of a mounting bracket 223. The mounting bracket 223 is substantially L-shaped, having another leg 224 projecting transversely to the leg 222, and is attached to the casing member 57a by suitable means such as screws 225.

A torsion spring 227, having one end engaged with the leg 222 of the mounting bracket 223 and the other end engaged with the lever 218, urges the lever 218 in a counter-clockwise direction as viewed in Fig. 7 toward engagement with the stop screw 212 carried by the lever 200. A coil spring 229 connected between the leg 202 and the base plate 183 is effective to hold the adjusting screw 212 on the leg 206 in yielding engagement with the face of the free end 214 of the lever 218, the face of the free end 214 being disposed at an oblique angle to the pin 212 for a purpose to be discussed in greater detail presently.

The hub 80 of the spool 20 has an elongation 231 formed thereon which has screw threads 232 formed on its outer peripheral surface. A nut 233 having slots 234, Fig. 9, in the outer peripheral edge portion thereof is screwed onto the threads 232 of the hub 80. The leg 222 of the bracket 223 is adapted to engage in any desired one of the slots 234 to thereby hold the nut 233 from turning. Thus it will be seen that as the spool 20 is rotated in a winding direction the nut 233 through its engagement with the threads 232 will be caused to move in toward the side plates 83 and 84 of the spool 20. On the other hand, when the spool 20 is caused to rotate in an unwinding direction the nut 233 will be caused to move outwardly from the side plates 83 and 84.

The bell crank lever 218 has a leg 237 which projects at right angles from the leg 216 into the path of movement of the nut 233 along the extension 231 of the shaft 80. Thus it will be seen that during an unwinding operation of the reel 20, whereby the nut 233 is moved outwardly along the shaft 80, the nut 233 moves into engagement with the leg 237 and is effective to rotate the lever 218 in a clockwise direction, as viewed in Fig. 7, against the urging of the torsion spring 227. Such rotation of the lever 218 moves the free end 214 thereof upwardly relative to the adjusting screw 212 and permits the lever 200 to be turned in a clockwise direction by the spring 229 to thereby move the ear 206w out of latching position relative to the lever L and thereby frees the metering valve 185 for an air feeding operation.

During a re-winding operation of the reel 20, the nut 233 is moved back in toward the reel 20, as previously discussed, and is thereby moved out of engagement with the leg 237 of the lever 218. This movement of the nut 233 permits the torsion spring 227, which is stronger than the coil spring 229, to turn the lever 218 in a counter-clockwise direction to thereby cam the lever 200 in a counter-clockwise direction into latching engagement with the lever L and effect positive closing of the metering valve 185. A stop screw 240 is adjustably mounted in the leg 204 of the lever 200 and is adapted to engage the base plate 183 of the housing 184 to afford adjustable means for limiting the counter-clockwise rotation of the lever 200.

In my novel hose reel, the mechanism for actuating the lever 218 may be readily set to effect valve-closing operation of the lever 200 at substantially any desired point in the re-winding actuation of the reel 20. This may be accomplished during the assembly of the reel 20 in the housing 24a by properly pre-positioning the nut 233 on the extension 231 of the shaft 80 before the leg 222 of the bracket 223 is engaged in a slot 234 in the nut 233. For example, it will be seen that if it is desired to effect latching and unlatching of the lever L at substantially the fully wound position of the reel 20, the nut 233 will be positioned on the shaft 80 so as to be substantially adjacent to the leg 237 when the reel 20 is in fully wound position so that relatively little rotation of the reel 20 is required to move the nut 233 into and out of engagement with the leg 237. However, if it is desired to effect latching and unlatching of the lever L at a point in the rotation of the reel 20 wherein the hose 26 is partially unwound therefrom, the nut 233 will be initially positioned a greater distance away from the leg 237 so that a greater rotation of the reel will take place between fully wound position thereof and the position at which the nut 233 engages the leg 237.

The articulated construction of the bell crank lever 200, it will be noted, affords protection against accidental injury to the metering valve 185 during movement of the lever 200 into latching engagement between the lever L and the pin 199. Thus, for example, if during a movement of the lever 200 toward latching engagement with the lever L, the lever L is in valve-opening position so that the ear 206w strikes the side thereof, the extension 206c is free to swing outwardly on its pivot pin 207 against the urging of the spring 209 until such time as the lever L moves toward valve-closing position, at which time the spring 209 urges the ear 206W into latching engagement with the lever L and the pin 199.

From the foregoing it will be seen that I have provided a novel and practical reel for flexible members, such as air hoses, electric light cords and the like, which is sturdy and compact, may be economically manufactured, operates in a novel and expeditious manner, and the performance of which is more flexible and more readily adapted to various conditions than reels heretofore known to the art.

Thus, while I have illustrated and described the preferred embodiments of my invention, it is to be understood that these are capable of variation and modification and I therefore do not wish to be limited to the precise details set forth, but desire to avail myself of such changes and alterations as fall within the purview of the following claims:

I claim:

1. A reel for flexible members comprising a spindle, a spool for holding loops of such a flexible member, said spool being mounted on said spindle for rotation thereon in a winding and an unwinding direction, means urging said spool in a winding direction, a stationary member mounted concentrically of said spindle, braking means pivotally mounted on said spool and normally frictionally engaging said stationary member to releasably hold said spool in predetermined position against the urging of said first named means, spring means urging said braking means toward engagement with said stationary member, and actuating means connected to said braking means operable upon rotation of said spool in an unwinding direction at less than a predetermined speed to move said braking means away from engagement with said stationary member, said actuating means being operable upon rotation of said spool in an unwinding direction at more than said predetermined speed to move said braking means into engagement with said stationary member.

2. A reel comprising a spindle, a spool rotatably mounted on said spindle for turning in either a winding or unwinding direction, a drum connected to said spindle, a lever fulcrumed on said spool for rotation therewith, a friction element carried by said lever, and a spring connected to said lever for urging said friction element toward said drum, said spring being effective when said spool is stationary in an unwound position to engage said friction element with said drum and thereby hold said spool in said position, said lever being so disposed relative to said friction element to be effective when said spool is rotated in an unwinding direction at less than a predetermined speed to urge said friction element away from engagement with said drum and effective when said spool is rotated at greater than said predetermined speed to urge said friction element into engagement with said drum.

3. A reel for holding a flexible member wound thereon, comprising a spindle, a spool rotatably mounted on said spindle for turning in either a winding or unwinding direction, a spring connected to said spool for turning it in a winding direction, a substantially circular-shaped drum nonrotatably connected to said spindle and having an outer peripheral edge portion, a lever fulcrumed on said spool for rotation therewith, a friction element carried by said lever, and a spring connected to said lever and effective when said spool is stationary in an unwound position to frictionally engage said friction element with said peripheral edge portion of said drum for holding said spool in said position, a portion of said lever being so connected to said spool to be effective when said spool is rotated in an unwinding direction at less than a predetermined speed to urge said friction element out of engagement with said peripheral edge portion of said drum to thereby tend to free the rotation of said spool, another portion of said lever being so disposed relative to said friction element to be effective when said spool is rotated at greater than said predetermined speed in either direction to press said friction element into engagement with said peripheral edge portion of said drum to thereby tend to retard the rotation of said spool.

4. A reel for holding a flexible member wound thereon, comprising a spindle, a spool rotatably mounted on said spindle for turning in either a winding or an unwinding direction, a drum connected to said spindle, a brake member carried by said spool for rotation therewith and adapted to operably engage said drum when said spool is stationary in a predetermined position to hold said spool in said position, spring means for urging said brake member into operable engagement with said drum when said spool is in said predetermined position, and control means operatively connected to said spool and rotatable therewith for controlling said operative engagement of said brake member with said drum, said last named means being responsive to centrifugal force and movable thereby through a predetermined path of movement when the speed of rotation of said spool in an unwinding direction is greater than one predetermined amount and less than another predetermined amount, said last named means being movable by centrifugal force through another predetermined path of movement when the rotation of said spool in either an unwinding or winding direction is greater than said other predetermined amount, means operatively connecting said control means to said brake member for urging said brake member out of said operative engagement with said drum during movement of said control means through said first mentioned predetermined path, and means operatively connecting said control means to said brake member for urging said brake member into said operative engagement with said drum during movement of said control means through said other predetermined path.

5. A reel for supporting a flexible member wound thereon, comprising a spindle, a spool rotatably mounted on said spindle for turning in either a winding or an unwinding direction, a drum connected to said spindle, a brake member carried by said spool and adapted to be moved into operable engagement with said drum to thereby hold said spool in a predetermined unwound position when said spool is stationary in said position, and spring means for urging said brake member into said operable engagement with said drum when said spool is in said predetermined position, and control means connected to said spool and rotatable therewith for releasing said brake member from said operable engagement with said drum by the centrifugal force caused by the rotation of said control means with said spool in an unwinding direction to thereby free said spool for reversal of said rotation to a winding direction, said control means being restrained by the inertia thereof from moving said brake member into operable engagement with said drum during the reversal of said rotation and said control means being effective on said brake member to engage said brake member with said drum by the centrifugal force on said control means caused by the rotation of said spool in said winding direction when the speed of said last named rotation exceeds a predetermined amount to thereby retard said last named rotation.

6. A reel for a flexible member wound thereon, comprising a spindle, a spool rotatably mounted on said spindle for turning in either a winding or an unwinding direction, a drum connected to said spindle, a brake member carried by said spool and adapted to be moved into operable engagement with said drum to thereby hold said spool in a predetermined unwound position when said spool is stationary in said position, spring means for urging said brake member into said operable engagement with said drum when said spool is in said peredetermined position, control means connected to said brake member and rotatable with said spool for releasing said brake member from said operable engagement with said drum by the centrifugal force on said control member caused by the rotation of said control member with said spool in an unwinding direction to thereby free said spool for reversal of said rotation to a winding direction, and means connected to said control member for yieldably restraining said control member from moving said brake member into operative engagement with said drum during said reversal of said rotation, and means carried by said control member for moving said brake member into engagement with said drum by the centrifugal force on said control member caused by the rotation of said control member with said spool in said winding direction to thereby retard said last named rotation when the speed of said last named rotation is greater than a predetermined amount.

7. A reel for a flexible member wound thereon, comprising a spindle, a spool rotatably mounted on said spindle for turning in either a winding or an unwinding direction, a drum connected to said spindle, a brake member carried by said spool and adapted to be moved into operable engagement with said drum to thereby hold said spool in a predetermined unwound position when said spool is stationary in said position, spring means for urging said brake member into said operable engagement with said drum when said spool is in said predetermined position, control means connected to said brake member and rotatable with said spool for releasing said brake member from said operable engagement with said drum by the centrifugal force on said control member caused by the rotation of said control member with said spool in an unwinding direction to thereby free said spool for reversal of said rotation to a winding direction, and a dash pot operatively connected to said control member for yieldingly restraining said brake member from moving into operative engagement with said drum during said reversal of said rotation, and means carried by said control member for moving said brake member into engagement with said drum by the centrifugal force on said control member caused by the rotation of said control member with said spool in said winding direction to thereby retard said last named rotation when the speed of said last named rotation is greather than a predetermined amount.

8. A reel comprising a spindle, a spool rotatably mounted on said spindle for turning in either a winding or unwinding direction, a spring connected to said spool for turning it in a winding direction, a drum connected to said spindle, two levers fulcrumed on said spool, each of said levers having a long end and a short end, each of said long ends including a counterweight, a tension spring yieldably connecting the long end of one of said levers to the short end of the other of said levers, a link connecting the short end of said one lever to the long end of said other lever, two friction elements, each of said friction elements being connected to a corresponding one of said levers, said tension spring being effective when said spool is stationary in a predetermined unwound position to engage said friction element carried by said one lever with said drum to thereby hold said spool in said position, said levers being operable by the centrifugal force caused by the rotation of said counterweights with said spool in an unwinding direction to move the corresponding friction elements out of engagement with said drum to thereby free said spool for reversal of said rotation to a winding direction, a dash pot operatively connected between said long end of said one lever and said short end of said other lever, said dash pot being effective to restrain the movement of said counterweights and said friction elements toward said drum during said reversal of rotation, and said levers being operable by the centrifugal force caused by the rotation of said counterweights with said spool to move the corresponding friction elements into engagement with said drum to thereby retard the rotation of said spool when the speed of said rotation exceeds a predetermined amount.

9. An air hose reel comprising a spindle, a spool upon which an air hose may be wound, said spool being rotatably mounted on said spindle for turning in either a winding or unwinding direction, a spring connected to said spool for urging said spool to turn in a winding direction, brake means carried by said spool for releasably holding said spool against turning in a winding direction from a partially unwound position, said brake means being adapted to be released by tension in an unwinding direction on such a hose wound on said spool to thereby free said spool for turning in a winding direction, and a release lever carried by said spool and adapted to engage said brake means and an inner convolution of such a hose wound on said spool, said release lever being operable to render said brake means ineffective to hold said spool against turning in a winding direction when more than a predetermined amount of such a hose has been unwound from said spool.

10. An air hose reel comprising a spindle, a spool upon which an air hose may be wound, said spool being rotatably mounted on said spindle for turning in either a winding or unwinding direction, a spring connected to said spool for urging said spool to turn in a winding direction, a brake lever fulcrumed on said spool and carried thereby for rotation therewith, a drum stationarily mounted relative to said spindle, a brake shoe carried by said brake lever and adapted to operatively engage said drum for releasably holding said spool against turning in a winding direction from a partially unwound position, means connected to said brake lever for urging said brake shoe into said operative engagement with said drum, said brake shoe being adapted to be released from operative engagement with said drum by tension in an unwinding direction on such a hose wound on said spool to thereby free said spool for turning in a winding direction, and a release lever carried by said spool and engageable with said brake lever and with an inner convolution of such a hose wound on said spool, said release lever being effective to pivot said brake lever against the urging of said means connected thereto to thereby prevent said brake shoe from operatively engaging said drum and holding said spool against turning in a winding direction when more than a predetermined amount of such a hose is unwound from said spool.

11. An air hose reel comprising a spool upon which an air hose may be wound, a spindle, said spool being rotatably mounted on said spindle for turning in either a winding or an unwinding direction, means for urging said spool to turn in a winding direction, brake means carried by said spool for releasably holding said spool from turning in a winding direction from a partially unwound position, and means connected to said spool and said brake means for releasing said brake means by tension in an unwinding direction on such a hose wound on said spool to thereby free said spool for turning in a winding direction, said last-named means being operable to partially apply said brake means to retard the rotation of said spool when said rotation exceeds a predetermined speed.

12. In an air hose reel of the type including a spindle, a spool upon which an air hose may be wound, said spool being rotatably mounted on said spindle for turning in either a winding or an unwinding direction and having an externally threaded hub portion, and brake means carried by said spool for releasably holding said spool from turning in a winding direction from a partially unwound position, means connected to said spindle and operable to feed compressed air from a supply source to such a hose on said reel when said reel is in such a partially unwound position, a nut operatively engaged with the threads on said hub and movable thereby longitudinally of said hub into and out of operative engagement with said means during rotation of said spool, said nut being operable during movement longitudinally of said hub to actuate said means to thereby vary the feeding of compressed air by said means.

13. A reel for holding a flexible member wound thereon, comprising a spindle, a spool rotatably mounted on said spindle for turning in either a winding or an unwinding direction, a drum connected to said spindle, a brake member carried by said spool and adapted to operably engage said drum when said spool is stationary in a predetermined position to hold said spool in said position, means for urging said brake member into operable engagement with said drum when said spool is in said predetermined position, and control means connected to said brake member and rotatable with said spool for controlling the operation of said brake member, said control means comprising a pivot connected to said spool and rotatable therewith, and an elongated arm rotatably mounted on said pivot, said arm being responsive to centrifugal force and rotatable thereby on said pivot through a predetermined path of movement upon rotation of said spool, means on said arm operatively connecting said arm to said brake member during movement of said arm through a predetermined portion of said path of movement for urging said brake member away from said engagement with said drum during movement of said arm through said predetermined portion of said path of movement, and means on said arm operatively connecting said arm to said brake member during movement of said arm through a portion of said path of movement other than said predetermined position for urging said brake member toward engagement with said drum during movement of said arm through said portion of said path of movement other than said predetermined portion.

14. A reel comprising a spindle, a spool rotatably mounted on said spindle for turning in either a winding or unwinding direction, a spring connected to said spool for turning it in a winding direction, a drum connected to said spindle, two levers fulcrumed on said spool, each of said levers having a long end and a short end, each of said long ends including a counterweight, a tension spring yieldably connecting the long end of one of said levers to the short end of the other of said levers, a link connecting the short end of said one lever to the long end of said other lever, two friction elements, each of said friction elements being connected to a corresponding one of said levers, said tension spring being effective when said spool is stationary in a predetermined unwound position to engage said friction element carried by said one lever with said drum to thereby hold said spool in said position, said levers being operable by the centrifugal force caused by the rotation of said counterweights with said spool in an unwinding direction to move the corresponding friction elements out of engagement with said drum to thereby free said spool for reversal of said rotation to a winding direction, and said levers being operable by the centrifugal force caused by the rotation of said counterweights with said spool to move the corresponding friction elements into engagement with said drum to thereby retard the rotation of said spool when the speed of said rotation exceeds a predetermined amount.

15. An air hose reel comprising a spindle, a spool upon which an air hose may be wound, said spool being rotatably mounted on said spindle for turning in either a winding or unwinding direction, a spring connected to said spool for urging said spool to turn in a winding direction, a brake lever fulcrumed on said spool and carried thereby for rotation therewith, a drum stationarily mounted relative to said spindle, a brake shoe carried by said brake lever and adapted to operatively engage said drum for releasably holding said spool against turning in a winding direction from a partially unwound position, means connected to said brake lever for urging said brake shoe into said operative engagement with said drum, said brake shoe being adapted to be released from operative engagement with said drum by tension in an unwinding direction on such a hose wound on said spool to thereby free said spool for turning in a winding direction, and said lever being operable by the centrifugal force caused by the rotation of said lever with said spool to move said brake shoe into engagement with said drum to thereby retard the rotation of said spool when the speed of said rotation exceeds a predetermined amount.

WILLIAM P. DALRYMPLE.

REFERENCES CITED

The following references are of record in the file of this patent:

UNITED STATES PATENTS

| Number | Name | Date |
|---|---|---|
| 1,188,072 | Hein | June 20, 1916 |
| 1,376,262 | Denny | Apr. 26, 1921 |
| 1,881,589 | Horton | Oct. 11, 1932 |
| 1,948,158 | Barr | Feb. 20, 1934 |
| 1,950,833 | Woodford | Mar. 13, 1934 |